United States Patent

Romer et al.

[11] Patent Number: 5,953,534
[45] Date of Patent: Sep. 14, 1999

[54] ENVIRONMENT MANIPULATION FOR EXECUTING MODIFIED EXECUTABLE AND DYNAMICALLY-LOADED LIBRARY FILES

[75] Inventors: Theodore H. Romer; Alastair Wolman; Dennis Chua Lee; Geoffrey Michael Voelker; Brian N. Bershad, all of Seattle, Wash.; John Bradley Chen, Winchester, Mass.; Henry M. Levy, Seattle, Wash.; Wayne Anthony Wong, Hillsboro, Oreg.

[73] Assignee: University of Washington, Seattle, Wash.

[21] Appl. No.: 08/996,838

[22] Filed: Dec. 23, 1997

[51] Int. Cl.[6] .................................................. G06F 9/445
[52] U.S. Cl. .................................................. 395/712
[58] Field of Search .................................. 395/712, 705, 395/685

[56] References Cited

U.S. PATENT DOCUMENTS

| | | | |
|---|---|---|---|
| 5,269,021 | 12/1993 | Denio et al. | 395/685 |
| 5,339,430 | 8/1994 | Lundin et al. | 395/685 |
| 5,634,058 | 5/1997 | Allen et al. | 395/712 |
| 5,832,271 | 11/1998 | Devanbu | 395/705 |

*Primary Examiner*—Tariq R. Hafiz
*Assistant Examiner*—Chameli C Das
*Attorney, Agent, or Firm*—Ronald M. Anderson

[57] ABSTRACT

A method and procedure for modifying modules comprising a binary executable software program in such a way that, despite the transformations performed and the creation of new versions of the modules, the transformed program appears (to that program, including all of its components) as if it is running in the identical environment as the original program. The environment includes environment variables, the name of the program, the names of all of the dynamically loaded library (DLL) files that the program references, the directory in which the program resides, and the current directory at the time the program started execution. When the program has been transformed, e.g., for the purposes of monitoring or measurement, the environment also includes the effective addresses of data and instruction references made by the program. By employing the present invention, a modified software program will have the same behavior as the original unmodified program from which it is derived, even though it and many of its environment characteristics have been changed.

26 Claims, 4 Drawing Sheets

FIG. 6

ENVIRONMENT MANIPULATION FOR EXECUTING MODIFIED EXECUTABLE AND DYNAMICALLY-LOADED LIBRARY FILES

FIELD OF THE INVENTION

The present invention generally relates to a computer implemented technique that modifies executable program files to produce modified executable program files that still execute properly, and more specifically, to a software tool and method for modifying executable and dynamically-loaded library (DLL) files to evaluate their performance and correct operation.

BACKGROUND OF THE INVENTION

Computer programs are typically written in either a high level language, such as $C^{++}$, or in assembly language. In the process of producing an executable program, a high level language program is first compiled and then linked to form a binary executable program. (Alternatively, a high level language may be interpreted to produce a binary executable program.) When the executable program runs, it may load DLL files, which it calls. All of the modules, whether dynamically- or statically-loaded, execute within an environment that defines many of the characteristics that are "apparent" to the executing program. These characteristics include, for example, the directory structure in which the program executes, the names of the files it expects to see, the names of the modules that are loaded by the program, and the name of the executing program itself.

The need frequently arises to examine (through software means) a binary executable. The examination may be necessary for reasons of analysis, performance evaluation, security, error checking, or to understand the structure of the executable program, and possibly, to modify that structure to produce another binary executable related to the original binary executable. The modified binary executable will preferably perform the same function as the original, but in addition, may measure some characteristic of the program's behavior as it runs, restrict that program's behavior in some way, or verify its operation as it executes. In order to perform this function correctly, it must be possible to modify any (and perhaps all) of the executable components that comprise the binary executable, producing new executable components that have the same original function, plus the intended modified or additional functions, while maintaining the original execution environment. By at least simulating the original execution environment, the transformed program and its modules will be unaware that anything has changed in the environment. Meeting both of these goals simultaneously is difficult, because in satisfying the first goal, some characteristics of the environment must be changed. In particular, it is often necessary to create new versions of the executable modules that may need to be stored in new file locations, and under new names. Also, one or more new executable modules may be needed. Such changes must be addressed in creating a transformed program that seems to run as if it were the original program.

The following simple example illustrates the importance of preserving the original program's environment. Suppose an original program named "prog.exe" contains the following code intended to open a data file expected to be named "prog.data."

\# Invoke a system-level routine to determine the name of the

\# current program (this instruction should return "prog.exe")

progName=GetProgramName();

\# Replacing the suffix ".exe" with the suffix ".data"

\# (in the following instruction should return "Prog.data")

datafileName=ReplaceSuffix(progName, ".exe", ".data");

\# Open the data file.

datafile=OpenFile(datafileName)

Now suppose that a binary-rewriting tool creates a new instrumented version of "prog.exe," called "prog-new.exe." Unless the environment is preserved, the transformed program "prog-new.exe" will fail to find the data file, because it will try to open "prog-new.data" rather than the original data file, "prog.data."

An apparent solution to this particular problem would be to give the transformed program the same name as the original program, and similarly, to give transformed DLLs the same names as the original DLLs. However, this solution is unsatisfactory, because it effectively changes the environment of the entire system. Specifically, references to the original program or DLLs that the original program accesses may accidentally refer to the transformed versions, resulting in unexpected behavior. Such unintended references to the transformed versions could come from users, other (non-transformed) programs, or even from code added to the program during the transformation process.

Accordingly, it will be evident that a solution to this problem must be found that avoids these problems. The solution should enable executable programs that have been transformed to run correctly without regard to any changes in their environment. Further, the task of creating a transformed program that meets this requirement should preferably be carried out using a program modifying tool that is implemented on a computer, requiring only minimal interactive input from a user.

SUMMARY OF THE INVENTION

The invention presented here is a general purpose method, which is carried out with a computer, to create transformed programs, by discovering and emulating the environment of the original program. More specifically, in accord with the present invention, a method is defined for creating a transformed software program from an original software program so that the transformed software program provides new functionality. However, the underlying functionality of the original software program is preserved in the transformed software program. The method includes the step of evaluating an environment of the original software program to identify all executable modules that are included therein. To implement the new functionality, one or more executable modules are modified as required, and/or one or more new executable modules are added. In addition, as required to emulate and maintain the underlying functionality of the original software program, one or more executable modules are modified. Any modified executable modules are then saved so that they are callable by the transformed software program.

The method also preferably includes the step of intercepting calls that return the name of any executable component that has been modified (i.e., its new name). An original name of the executable component corresponding to the executable component that was modified is determined and returned.

The step of evaluating the environment of the original software program includes the step of executing the original software program. As the original software program executes, a list of the executable modules that are loaded is written.

The step of evaluating the environment of the original software program preferably includes the step of identifying an initial executable module. An import table of the initial executable module is then analyzed to identify another executable module referenced therein. The step of analyzing the import table of successive executable modules is repeated to identify additional executable modules, and a list of the executable modules thus identified is written.

To modify an executable module as required to implement the new function, the executable modules on the list of the executable modules that must be modified to implement the new function are first identified. An import table of each of the executable modules is parsed to determine if any executable module that has been modified is called in the import table, and if so, a new import table is created that instead calls the modified executable module.

The step of modifying an executable module identified as required to emulate and maintain the underlying functionality of the original software program preferably includes the step of adding a runtime wrapper module that references revised library function modules instead of original library function modules, to the new import table. For modules that contain non-modifiable entry points known to modules outside the scope of the transformation process (such as modules employed by the operating system), an auxiliary module is created in order to redirect references to the location of the original module in a virtual address space so that the references are to corresponding addresses in the transformed version of the module. In addition, an address lookup table is preferably created to indicate changes in addressing of the modified executable modules, which is required due to differences in the size of each modified executable module relative to its corresponding executable module.

Other aspects of the present invention are directed to a system for creating a transformed software program from an original software program so that the transformed software program provides a new function, while preserving an underlying functionality of the original software program, and to an article of manufacture adapted to be used with a computer that implements machine instructions stored on a memory media. In the case of the system, a processor carries out functions defined by machine instructions stored in a memory that are generally consistent with the steps of the method described above. Similarly, the machine instructions stored on the memory media comprising the article of manufacture define functions that are implemented by a computer and are also generally consistent with the steps of the method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Environment Discovery and Definition:

Discovering the environment of an original program consists primarily of identifying the name and location of the original program, and the names and locations of the DLL files that it uses. Some programs may actually comprise multiple executable files, in which case the process of identifying subsidiary executables is substantially similar to that of identifying DLL files. There are four ways to discover a DLL or executable file used by an original program, and these four approaches correspond to the techniques typically employed for loading a DLL or executable file into a computer system, as follows. In the first technique, the name and location of a main program binary file is supplied by the user interested in applying the transformation to that file. Any additional modules required by the program can also by identified explicitly by the user, assuming that this information is known.

The second technique assumes that the name and location of a single module are given. The names of additional modules are then identified by parsing an import table in a header of the given module. The location of these modules is determined by searching for them along the current execution path. This process is then repeated recursively, so that the import tables of each discovered module are examined, until all of the modules referenced and used by the program are identified.

Modules that are loaded explicitly by the program are identified during a run of the unmodified program, in the third technique. For example, in Microsoft Corporation's WINDOWS NT operating system, modules are typically loaded by making calls to "LoadLibrary" and "CreateProcess." One method for identifying these modules is to run the program under the control of a debugger process, which is notified when each new DLL is loaded into the address space of the computer system and when each new process is created. Another method is to replace the call sites for LoadLibrary and CreateProcess routines provided in the operating system run by the computer with code that records the arguments passed to these routines.

Finally, in the fourth technique, modules that are loaded explicitly are identified during a run of the transformed program, using the same approaches as described in the third technique, or by using techniques for intercepting LoadLibrary and CreateProcess calls that are described below, in the section entitled Environment Emulation and Creation. The approach used in the fourth technique implies that environment discovery and emulation need not be strictly separate phases. In other words, a program can be partially transformed, and if additional modules are discovered while the partially transformed program runs, these modules can be transformed on the fly.

An additional component of environment discovery is determining the load addresses of the original modules. This component is described in more detail below, in the section entitled "Effective Address Emulation." The results of environment discovery can be recorded in a file or in the rewritten modules themselves, to be used at runtime of the transformed program, during environment emulation.

Environment Emulation and Creation

There are two important parts to environment emulation. First, the environment must be initialized so that the transformed versions of the executable and DLL files are used instead of the original versions. Second, the environment must be made to appear to the transformed program as though no changes have been made.

A transformed program comprises executable modules and DLLs that have different names than in the original program. For example, in a preferred embodiment of the present invention that uses a computer software tool referred to as "ETCH" to create a transformed program, a transformed version of an executable module "prog.exe" might be named "prog-etch.exe," and a transformed version of a DLL file that is, for example, originally called "kitty.dll," might be named "kitty-etch.dll." When the transformed program runs, all attempts to refer to "prog.exe" or "kitty.dll" in the machine instructions that are executing on a processor must be detected and modified so that they instead refer respectively to "prog-etch.exe" and "kitty-etch.dll." These references to the executable file and DLL file of the preceding example can occur in exactly the same ways as described above under "Environment Discovery," namely, as explicit references by the user, in the binary file header, and at runtime through calls to system routines such as "LoadLibrary." Therefore, the file headers of the transformed modules must refer to transformed modules by their name, not to the names of original modules; and when the transformed program runs, calls to "LoadLibrary" must be detected and redirected to the transformed modules by their names.

These transformations are carried out in a preferred embodiment of the present invention as follows. For each executable module and DLL identified during Environment Discovery, its file header is read and parsed to extract its import table. From this information, a new import table is constructed. The new import table is the same as the original import table, except for at least two changes. Specifically, for each DLL that has been modified, the new import table refers to the modified version of the DLL, and an additional DLL is imported that provides "wrapper" functions for the relevant operating system calls (LoadLibrary, GetModuleHandle, CreateProcess, etc.). Optionally, a change can be included in the new import table so that additional DLLs may be imported to enhance the functionality of the original program, for example, to perform runtime monitoring of performance or correctness.

In Microsoft Corporation's WINDOWS NT graphics operating system, for which the embodiment of the present invention, ETCH, has been written, additional DLLs may be referenced in an export table that uses a "forwarding" mechanism. For example, the DLL file called "library.dll" might contain an export record for the function "func" to indicate that the function is in fact implemented in a different library called "libraryl.dll." Therefore, the export table for library.dll must also be rewritten so that it refers to the modified versions of such DLL files, e.g., the function "func" would be forwarded to "library2-etch.dll," the modified DLL file, instead of "library1.dll."

All references within the body of a module to the original import table must be detected and modified to refer to the new import table. References to an import table are relocatable, because if the module is loaded at a different base address from its preferred base address, pointers to the import table must be adjusted appropriately for the new location at load time. Hence, references to the import table for a program have relocation records that are provided in the header of the executable file.

References to the import table in a program are detected by checking each address that has a relocation record in the header of the executable file, and checking whether the value at that address is a pointer into the import table. (The details of this check depend on how the import table is laid out in the executable file.) If an address is a pointer to the record for an entry in the import table for one of the "wrapped" library functions, it is modified to point to the record in the import table for the corresponding wrapper function. If the address is a pointer to the record for an entry in the import table for some other function in a DLL file, it is modified to point to the record for the entry in the import table for the same function in the corresponding modified version of the DLL file.

In the absence of relocation records, import table references and other indirect jumps and calls to the transformed module must be corrected at run time. Indirect jumps and call within the transformed module can be handled by inserting a run-time table lookup before the relevant instruction. This table maps addresses in the original, unrelocated module to the corresponding address in the transformed module.

Indirect jumps and calls that originate outside the transformed module are handled by creating a "husk DLL" that occupies the same position in a virtual address space as the original module, as described below under "Hardwired External Entry Points." In the absence of relocation records, import table references in the transformed module are not modified, and so refer to the import table of the husk DLL. Thus, additional steps are needed to correct the import table for the husk DLL.

The correct import table for the husk DLL is created as follows.

1. Statically, the husk DLL is created with an import table that is identical to the original DLL—that is, the import table for the husk DLL refers to the original modules, not to transformed or patched modules.

2. Statically, the import table for the transformed DLL is created as described herein for other transformed or patched modules.

3. Statically, to prevent the operating system from loading the untransformed (original) modules, the pointer to the import table in the husk DLL's file header is set to zero.

4. At run time, initialization code added to the transformed DLL loads in the husk DLL and modifies the addresses in the import table of the husk DLL to refer to the corresponding functions in the transformed or patched modules, by copying the addresses from its own import table.

If calls to additional DLLs are added to the module, these calls will include references to the new import table. Hence, appropriate relocation records must be added to the relocation table for the transformed module so that the new import table reference is relocated. Furthermore, some of the parameters to the call may themselves be pointers, in which case they will require relocation records as well. (Call instructions can be identified in the binary executable file, for example, using the code discovery techniques described in the disclosure of a copending, commonly assigned patent application, Ser. No. 08/996,839, filed Dec. 23, 1997, entitled, "Discovering Code and Data in a Binary Executable Program.")

Environment Spoofing

When the transformed program runs, the program may make calls to determine the name or location of the executable or DLL files, or other facets of its environment. WINDOWS NT provides a function, GetModuleFileName, which when called, returns the full path and name of an executable or DLL file. From this information, a program might determine the directory in which to find data files, or the name of a data file. Since the name and directory of the module will have changed in the transformed program, calls to GetModuleFileName must be intercepted and transformed to return the path and name of the original module instead of that of the transformed module.

In addition, the program may make calls to explicitly load libraries by name using the WINDOWS NT operating system call, LoadLibrary. If the call is allowed to take place without intervention, the original version of the library will be loaded. Any DLL files referenced by this library function will themselves be original versions instead of the corresponding transformed versions. Employing the original DLL files would result in an incomplete result in executing the transformed program. Also, it is possible that two versions of the same DLL file might be loaded into the address space, which would likely cause unpredictable behavior during execution of the transformed program.

The purpose of the runtime environment spoofing employed by the present invention then is twofold. It ensures that any observations by the transformed program of the environment conceal the transformation of the program and its location; and, it ensures that only transformed versions of the program and the DLL files that it references are loaded. The details of the runtime component of environment spoofing are as follows.

Environment Wrappers: When the modified program runs, all calls by the program to the operating system library routines LoadLibrary, FreeLibrary, GetModuleHandle, CreateProcess, and GetModuleFileName are replaced by the present invention with corresponding library routines that provide the additional functionality needed to achieve the results described above. In a preferred embodiment of the present invention, the new library routines are distinguished simply by adding the prefix "Etch."

Initialization: Before any of the replacement library routines run, data structures are initialized that describe the correspondence between the names of the original executable and DLL files and the names of the transformed versions, as well as noting any modules that were deliberately left untransformed.

EtchGetModuleHandle: The original version of this library routine takes one argument, a string with the name of a DLL file. If the DLL file has been loaded into the address space, the routine returns a handle identifying the DLL file.

Since the transformed program calling GetModuleHandle does not know that the name of the DLL file has been changed, it will typically make a call such as EtchGetModuleHandle("lib.dll"). The data structures described above are consulted, and a call to the original system routine GetModuleHandle("lib-etch.dll") is made, and the result is returned to the caller of EtchGetModuleHandle.

An exceptional case that must be handled correctly arises when the transformed program calls EtchGetModuleHandle on a DLL file that has not been loaded into the address space, e.g., because the DLL file does not exist. For example, suppose "nosuch.dll" does not exist. On a call to EtchGetModuleHandle("nosuch.dll"), to preserve the behavior of the original program, it is sufficient to first call GetModuleHandle("nosuch-etch.dll"); if this call returns an error status, then a call to GetModuleHandle("nosuch.dll") is made. This call should also return an error status, which is returned to the original calling entity. (If the call to GetModuleHandle("nosuch.dll") returns successfully, it indicates that an untransformed version of "nosuch.dll" was inadvertently loaded into the address space.)

A second exceptional case that must be handled can occur if during the transformation process, a DLL file is deliberately left unchanged. For example, if runtime data structures indicate that a file called "pristine.dll" was not transformed, then an error condition does not arise if a call to GetModuleHandle("pristine.dll") succeeds.

EtchLoadLibrary: The original version of this operating system library routine takes as its first argument a string with the name of a DLL file. It is loaded into the address space if necessary, and a handle to the DLL file is returned. The implementation of EtchLoadLibrary is very similar to that of EtchGetModuleHandle. A call to EtchLoadLibrary("lib.dll," . . .) results in a call to LoadLibrary("lib-etch.dll," . . .) and if successful, the result is returned to the calling entity. In addition, the DLL file is added to an internal data structure that tracks the status of the transformed program's DLL files.

However, the exceptional cases must be handled differently from GetModuleHandle. In particular, if the call to LoadLibrary("lib-etch.dll," . . .) fails, it is not appropriate to call LoadLibrary("lib.dll," . . .), because doing so could load an unmodified version of the DLL file into the address space of the computer.

A failure of LoadLibrary("lib-etch.dll," . . .) has several possible causes, and corresponding actions can be taken in a preferred implementation of EtchLoadLibrary. The following is a list of the different causes and the corresponding actions:

"lib.dll" was inadvertently not transformed. In this case the failure is noted, and one of several actions can occur: the program can be terminated, the untransformed library can be loaded and the system can proceed with a possibly unsafe or incorrect execution of the program, or, the transformation can be performed on the fly.

"lib.dll" does not exist. In this case the error status can be returned to the calling entity of EtchLoadLibrary.

"lib.dll" exists, but is not used as code. In this case it is safe to load the untransformed version of "lib.dll," because it cannot result in an unsafe or incorrect execution of a DLL file.

"lib.dll" exists, but is not a valid DLL file. In this case it is correct to call LoadLibrary("lib.dll," . . .) and return the resulting error status to the caller of EtchLoadLibrary.

EtchFreeLibrary: The original version of this operating system library routine takes one argument—a handle to a DLL file. If there are no more references to the library routine, the DLL file is unloaded from the address space of the computer. EtchFreeLibrary simply calls the underlying operating system FreeLibrary routine. If after the call, the DLL file has been unloaded from the address space, this library routine updates the internal data structures that track the status of the program's DLL files accordingly.

EtchCreateProcess: The original version of this operating system library routine creates a new process that executes a program with a given filename. EtchCreateProcess is almost exactly analogous in operation to that of EtchLoadLibrary. The details of the arguments to the conventional CreateProcess function are slightly different than EtchCreateProcess, and there is no concept of calling CreateProcess on a program that is not used as code.

EtchGetModuleFileName: The original version of this operating system library routine, GetModuleFileName, takes one argument, a handle to a DLL or executable file (for example, the handle returned by GetModuleHandle), and returns the name of the referenced DLL file. EtchGetModuleFileName simply calls the system routine GetModuleFileName, which returns the name of the transformed module (for example, "lib-etch.dll"). The runtime data structures are consulted to find the name of the original file name ("lib.dll"), and the original file name is returned to the caller of EtchGetModuleFileName.

Hardwired External Entry Points

Almost all external entry points into DLLs and executables are described completely by the modules' import and export tables. However, in a few cases, a component that was not controlled by the transformation process—such as the operating system—may hold a pointer to a function in a transformed module. For example, in WINDOWS NT, the operating system has several "hardwired" (non-modifiable) pointers to functions in the DLL "user32.dll." In the transformed program, however, the value of these pointers is incorrect, because the position of the function in the transformed module is different from the position in the original module. The pointers cannot be corrected statically, because the transformation process was not applied to the operating system.

To ensure that the correct code in the transformed program is executed when the operating system makes a call through such a pointer, a husk DLL can be created for each relevant module. (In practice, only a few DLLs require husks.) The husk DLL occupies exactly the same position in virtual address space as the original module that contains the target function(s) and contains the same code and data as the original DLL, except that procedure entry points are overwritten with jumps to the corresponding addresses in the transformed module.

Effective Address Emulation

Background: One goal of the preferred embodiment of the executable binary program rewriting tool comprising the present invention is to allow transformation of the original program for the purposes of monitoring or performance evaluation of the executable binary program. These types of program transformations perform tasks referred to as "instrumentation." Instrumentation is accomplished by attaching an analysis module to the original program. The purpose of the analysis module is to observe the program behavior at program execution time. The program actually running is the transformed executable, but the analysis module is intended to analyze the original executable rather than the transformed one. Since the present invention enables the environment in which the transformed program executes to appear identical to that of the original program, the information returned by the analysis module accurately applies to the original program.

The transformation process inserts procedure calls to the analysis module at certain points in the original program. The arguments to these procedure calls specify information about the processor or memory state of the original program that is returned during the execution of the transformed program. In particular, the addresses of instructions and operands can be passed to the analysis code. To allow accurate analysis, the addresses should be the same as those in the original program. This section describes how the present invention ensures that the analysis code sees the correct instruction and operand addresses.

Mechanism: The transformation process alters the size of the modified modules that make up the transformed program. As a result, the operating system loads the modified modules at different load addresses (the module "image base") compared to those used for the original modules in the original program. To preserve the original addresses of instruction and operand references, the rewriting software tool comprising the present invention must determine the original module image bases at instrumentation time, i.e., when the transformed program is being created, or at runtime for the transformed program.

The problem is conveniently divided into two components: (1) emulation of instruction addresses, and (2) emulation of operand addresses (these can be either instruction or data addresses). The components are as follows.

Instruction Addresses: The original address of an instruction is calculated by adding the offset of the instruction within the module, i.e., the instruction's relative virtual address (RVA), to the original module image base. If the original module image base is known statically, this calculation can be performed at instrumentation time when the transformed program is created and saved. If the module image base cannot be determined statically, then a runtime support routine can be called (as arranged by the present invention) to add the image base to the RVA. Correct emulation of instruction addresses requires that the correct image load base address for each component module (DLL or executable file) in the original program be determined following a transformation of the program. For example, the WINDOWS NT operating system loader uses the following steps:

1. Load the modules, in prefix depth first search order, using an Image Import Directory specified in the file header of the program.

2. For each module loaded, read the default image base and image size from the file header of the module.

3. For each module loaded, assign a load address by locating a free contiguous portion of the address space whose size is greater than the image size. The search for the load address starts just after the end of the main executable module, and searches upward in the address space until it finds a free range that is large enough. An added requirement is that the load address must be evenly divisible by 20000 (hexadecimal base).

If all of the modules in use by the program can be determined before the translated executable is run, then the above algorithm can be simulated, and the correct image bases can be determined at instrumentation time, so that a runtime lookup is not required. If not, the image base for a given module can be determined by simulating the above algorithm at runtime, in the wrapper implementations of EtchLoadLibrary and EtchFreeLibrary that are used in a preferred embodiment of the present invention. Accordingly, for each instruction address emulated, extra code is generated by the embodiment to perform the addition of the runtime determined image base to the statically determined RVA for the instruction.

Operand Addresses: Emulating operand addresses can be more difficult than emulating instruction addresses, because in some cases, neither the RVA of the operand nor the module containing the operand can be determined statically. For example, with regard to indirect memory references, it is generally impossible to statically determine the RVA or module that contains the reference. Therefore, operand address translation must occur at runtime, with the computed address being translated by a mapping table (one map per module) that is used to map offsets in each translated executable file into offsets in the corresponding original executable file. This mapping table also maps the image bases of the transformed modules to the image bases of the original modules. These image bases are determined in the same way as described in the preceding section for determining instruction addresses. Some operand addresses, such as stack references, are not directly affected by the transformation process and therefore are not translated at runtime, but instead, are simply passed unchanged to the analysis routines. The location of heap data is also affected by the transformation process. Generating the correct effective address for heap references requires simulating the addresses of heap data as allocated by the untransformed program.

Logic Applied to Produce a Transformed Program

Figure 1:
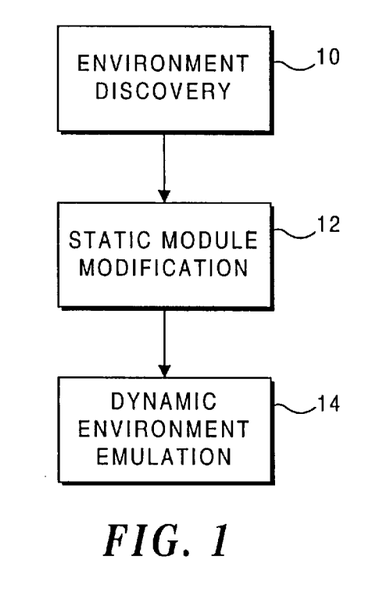
FIG. 1 is an overview block diagram illustrating the steps of the method used for modifying an original software program.

Although the overall technique employed in a preferred embodiment of the present invention referred to above as the ETCH software program is described in considerable detail in the preceding discussion, it may be helpful to summarize the operation of this tool and the method it employs by reference to flow charts shown in FIGS. 1–4. Turning first to FIG. 1, an overview of the procedure used by a preferred embodiment of the present invention is illustrated. As noted above, the procedure begins with discovering the environment of the original program, as indicated in a block 10. Next, as provided in a block 12, any required modifications of one or more static modules are implemented to achieve the additional or new functionality required of the transformed program, while enabling the transformed program to execute so that it appears to be in the environment of the original software program. Finally, steps are implemented to achieve the dynamic environment emulation of the original software program, as indicated in a block 14.

Figure 2:
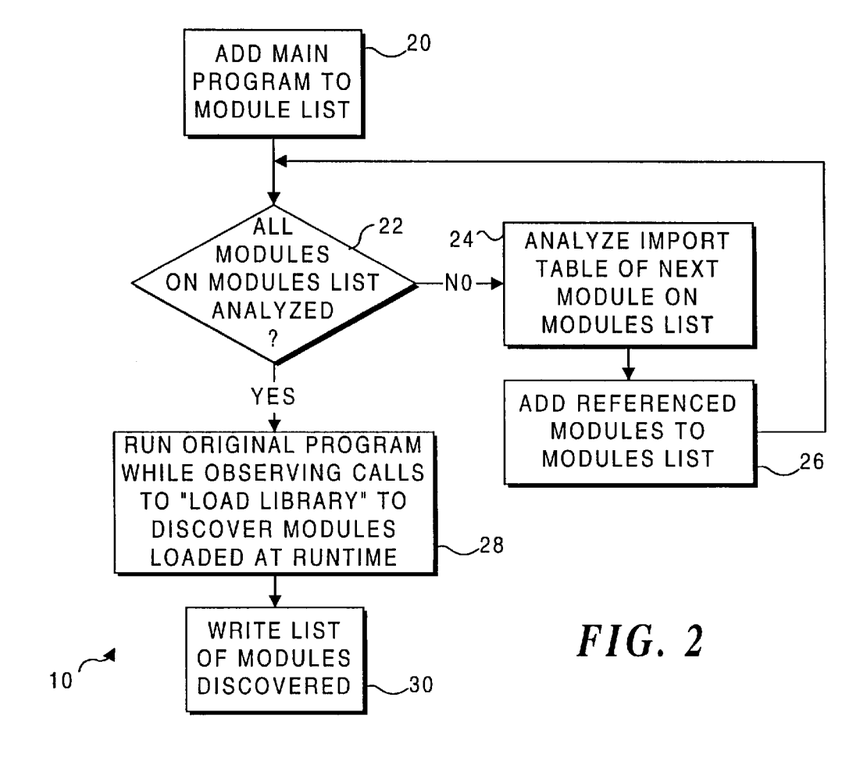
FIG. 2 is a flow chart illustrating the logical steps used to discover the environment of the original software program.

Details relating to discovering the environment for the original program (as broadly noted in block 10 of FIG. 1) are illustrated in FIG. 2. In a block 20, this procedure begins by adding the main executing program of the original program to a modules list. A decision block 22 then determines if all modules on the modules list have been analyzed. If not, a block 24 analyzes an import table of the next module on the modules list. As noted above, the import table of a module is determined by parsing the header of the module which references the import table. This step helps to identify other modules that are referenced by the import table, and as indicated in a block 26, the referenced modules are added to the modules list. This step is recursive, since each time that a new module is identified, its import table can be evaluated to determine other new modules referenced therein. The logic thus proceeds from block 26 back to decision block 22 to repeat the analysis of each module that is added to the modules list by the analysis step carried out in block 24.

Once all of the modules on the modules list have been analyzed in accord with the preceding steps, a block 28 provides for running the original program while observing any calls made to the operating system load library routine, to discover modules that are only loaded at runtime. Any such modules are noted and added to the modules list, so that in a block 30, all modules that have been discovered in the previous steps will have been written to the list.

Figure 3:
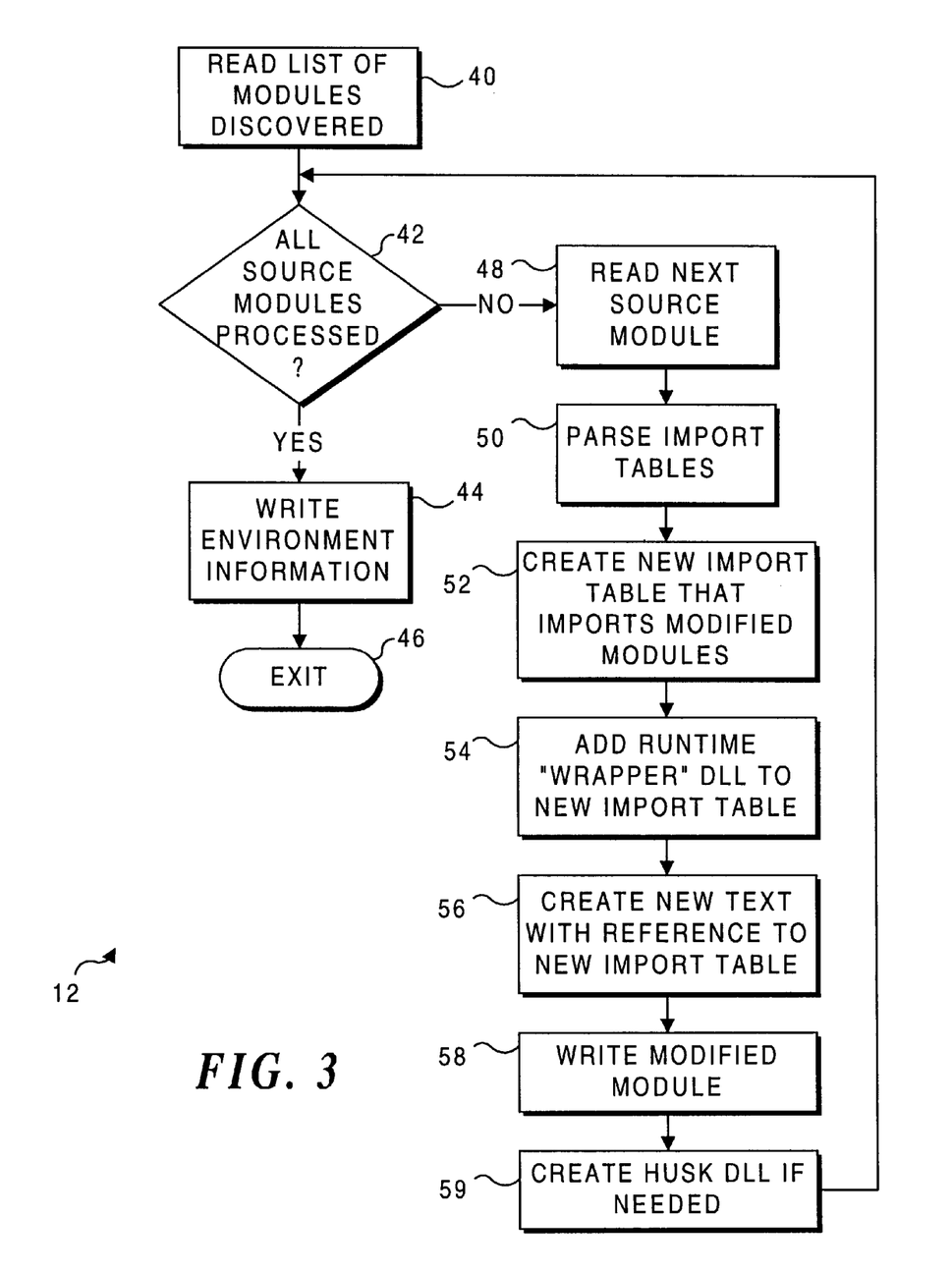
FIG. 3 is a flow chart illustrating the logical steps used for static module modification in the present invention.

Details of the broadly recited step of block 12 in FIG. 1 are illustrated in FIG. 3. A block 40 provides for reading the list of modules that have been discovered during the environment discovery phase (i.e., in block 10 of FIG. 1). A decision block 42 determines if all modules identified on the modules list have been processed and if not, a block 48 reads the next module on the list of modules. A block 50 then provides for parsing the import table of the module that has just been read from the list, so that as indicated in a block 52, a new import table that imports any modified modules can be created for use instead of the original import table for the module. In this step, any module that has been modified in connection with providing the new function (or for emulating the environment of the original software program) and which is referenced by its original name in the import table of the module that is currently being processed must be referenced by the name of the modified module in the new import table for the module currently being processed.

In a block 54, a runtime wrapper DLL is added to the new import table to provide calls to the modified library wrapper routines corresponding to the library routines of the operating system. The modified library wrapper routines are employed to ensure that the environment of the transformed software program appears the same as the environment of the original software program when the transformed program executes. As noted above, in the WINDOWS NT operating system, the wrapper routines include LoadLibrary, FreeLibrary, etc. In a block 56, new text is created that refers to the new import table created in block 52, thereby modifying the original module so that the new import table is referenced in the header of the module. A block 58 then provides for writing the modified module into memory. If necessary (not usually required), a block 59 provides for creating a husk DLL to accommodate those cases where a component not controlled by the transformation, such as the operating system, holds a pointer to function in a transformed module, as discussed above. The logic then loops back to decision block 42. Each of the source modules are thus processed by recursively looping through blocks and returning to decision block 42 until all of the modules on the list of modules have been processed. Thereafter, a block 44 provides for writing the environment information for the (partially) transformed program into memory. The procedural exits at a block 46.

Figure 4:
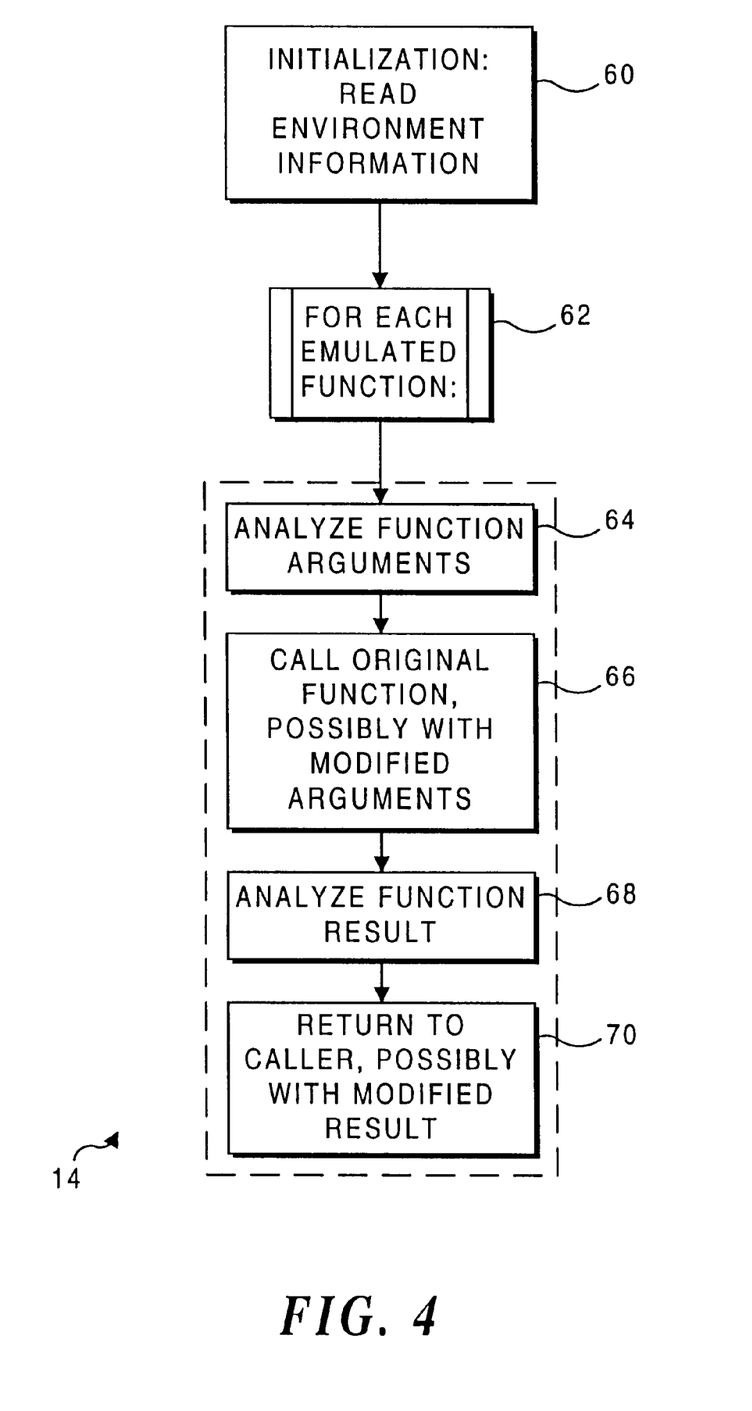
FIG. 4 is a flow chart illustrating the steps employed for dynamic environment emulation in the present invention.

The dynamic environment emulation referenced in block 14 of FIG. 1 is shown in greater detail in FIG. 4. In this Figure, a block 60 provides for initialization in which the environment information for the (partially transformed software program) written in block 44 of FIG. 3 is read. It should be noted that these steps occur when the partially transformed program is executing. In a block 62, for each emulated function that has been provided, the steps in blocks 64 through 70 are carried out.

In block 64, the procedure calls for analyzing the function arguments for calls that occur during the program execution to determine which refer to modified executable files and which refer to the original executable files that have not been transformed or modified. Thus, in block 66, a call to an original function may require a modified argument if the argument refers to a module that has been modified as part of the preceding transformation process. Similarly, in block 68, a function result is analyzed to determine if the result being returned to the calling entity needs to be modified. Block 70 provides that the return to the calling entity is modified as necessary, for example, if the result refers to a modified module. All of the steps carried out on the dash line portion of FIG. 4 are implemented for each emulated function called to ensure that the environment appears to be the same as in the original program execution and any changes to the function arguments required to achieve this result are made.

Computer Suitable for Imnplementing the Present Invention

Figure 5:
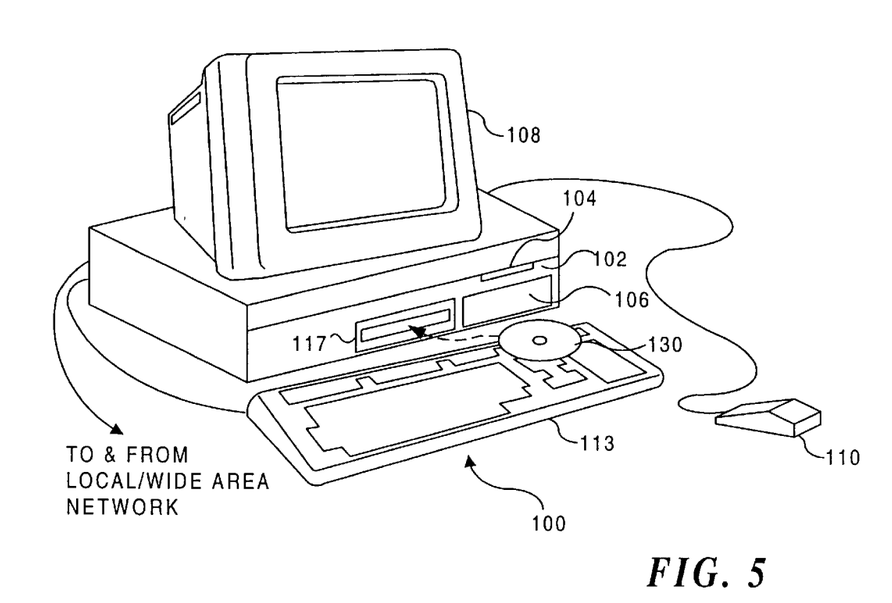
FIG. 5 is an isometric view of a typical personal computer for use in practicing the present invention.

With reference to FIG. 5, a generally exemplary personal computer 100 is illustrated, which is suitable for use in practicing the present invention. The personal computer includes a processor chassis 102 in which are mounted a hard drive 106 and, optionally, a floppy disk drive 104. A motherboard within the processor chassis is populated with appropriate integrated circuits (not shown) and a power supply (also not shown). A monitor 108 is included for displaying graphics and text generated by software programs executed by the personal computer. A mouse 110 (or other pointing device) is connected to a serial port (or to a bus port) on the rear of processor chassis 102, and signals from mouse 110 are conveyed to the motherboard to control a cursor and to select text, menu options, and graphic components displayed on monitor 108 in response to software programs executing on the personal computer, including the software program implementing the present invention. In addition, a keyboard 113 is coupled to the motherboard for entry of text and commands that affect the running of software programs executing on the personal computer.

Personal computer 100 also optionally includes a compact disk-read only memory (CD-ROM) drive 117 into which a CD-ROM disk may be inserted so that executable files and data on the disk can be read for transfer into the memory and/or into storage on hard drive 106 of personal computer 100. Personal computer 100 can be coupled to a LAN or wide area network (WAN).

Figure 6:
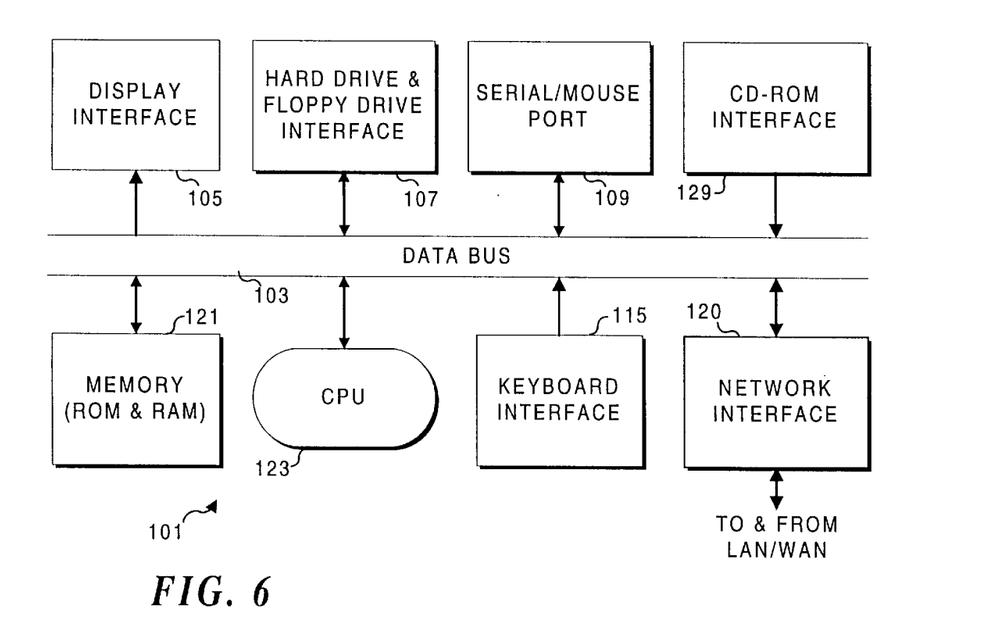
FIG. 6 is a block diagram illustrating functional components of the personal computer of FIG. 5.

Although details relating to all of the components mounted on the motherboard or otherwise installed inside processor chassis 102 are not illustrated, FIG. 6 illustrates some of the functional components that are included. The motherboard includes a data bus 103 to which these functional components are electrically connected. A display interface 105 generates signals in response to instructions executed by a central processing unit (CPU) 123 that are transmitted to monitor 108 so that graphics and text are displayed on the monitor. A hard drive/floppy drive interface 107 is coupled to data bus 103 to enable bidirectional flow of data and instructions between data bus 103 and floppy drive 104 and/or hard drive 106. Software programs executed by CPU 123 are typically stored on either hard drive 106, or on a floppy disk (not shown) that is inserted into floppy drive 104. The present invention will likely be distributed as a stand-alone application or software tool that is used in connection with an operating system such as Microsoft Corporation's WINDOWS NT. The computer language instructions that cause the CPU to implement the present invention will thus likely be distributed on a memory media, such as floppy disks, on a CD-ROM disk 130, or on other optical or magnetically readable memory media. Alternatively, the software may be distributed over the Internet or other network.

A serial/mouse port 109 is also bidirectionally coupled to data bus 103, enabling signals developed by mouse 110 to be conveyed through the data bus to CPU 123. A CD-ROM interface 129 connects CD-ROM drive 117 to data bus 103. The CD-ROM interface may be a small computer systems interface (SCSI) type interface or other interface appropriate for connection to and operation of CD-ROM drive 117. Although a CD-ROM drive is indicated, it is also contemplated that other types of optical storage devices such as a DVD and an appropriate interface might also be used.

A keyboard interface 115 receives signals from keyboard 113, coupling the signals to data bus 103 for transmission to CPU 123. Coupled to data bus 103 is a network interface 120 (which may comprise, for example, an ETHERNET card for coupling the personal computer to a LAN and/or WAN). Thus, software used in connection with the present invention may optionally be stored on a remote server and transferred to personal computer 100 over the network to implement the present invention.

When a software program is executed by CPU 123, the computer instructions comprising the program that are stored on memory media such as a floppy disk, CD-ROM disk 130, a server (not shown), or on hard drive 106 are transferred into a memory 121 via data bus 103. Computer instructions comprising the software program are executed by CPU 123, causing it to implement functions determined by the instructions. Memory 121 includes both a non-volatile read only memory (ROM) in which computer instructions used for booting personal computer 100 are stored, and a random access memory (RAM) in which computer instructions and data are temporarily stored when executing programs, such as the software program implementing the present invention.

Although the present invention has been described in connection with one or more preferred forms of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for modifying an original software program to produce a transformed software program that implements a new functionality not provided by the original software program, as well as functions of the original software program, comprising the steps of:
   (a) determining all executable components included in or referenced by the original software program;
   (b) creating a new environment for the modified executable program by:
      (i) modifying one or more executable components to implement the new functionality not provided by the original software program, producing corresponding one or more modified executable components;
      (ii) extracting an original import table from each executable component comprising the original software program; and
      (iii) creating a new import table from the original import table for an executable component, if the original import table includes a reference to a modified executable component, said new import table including a reference to each modified executable component instead of the executable component to which said modified executable component corresponds; and
   (c) dynamically emulating an environment of the original software program when executing the transformed software program by:
      (i) intercepting calls to load any executable component that has been modified and determining a name for the modified executable component corresponding to the executable component being loaded; and
      (ii) loading each modified executable component for execution instead of the executable component to which it corresponds, thereby enabling the transformed software program to substantially carry out the functions implemented by the original software program, in addition to said new functionality.

2. The method of claim 1, further comprising the steps of:
   (a) intercepting calls that return the name for any executable component that has been modified;
   (b) determining an original name of the executable component corresponding to the executable component that was modified; and
   (c) returning the original name of the executable component determined in the preceding step (b).

3. The method of claim 1, wherein the step of extracting the original import table from each of the executable components comprising the original software program includes the steps of:
   (a) parsing a file header of said executable components comprising the original software program; and
   (b) constructing the original import table from information contained in the file header of said executable components.

4. The method of claim 1, wherein the step of determining the executable components included in the original software program comprises the steps of:
   (a) parsing the original import table for each previously identified executable component, to identify additional executable components;
   (b) parsing an original import table for the additional executable components; and
   (c) repeating these steps until no additional executable components can be identified.

5. The method of claim 1, wherein the step of determining all executable components included in or referenced by the original software program comprises the steps of:
   (a) executing the original software program; and
   (b) detecting calls to load the executable components so that they are identified.

6. The method of claim 1, further comprising the step of providing modified library functions for corresponding library functions in an operating system under which the transformed software program executes, said modified library functions providing additional functionality enabling modifications to the original software program to be concealed when the transformed software program executes and ensuring that the modified executable components are loaded instead of the corresponding executable components included in the original software program.

7. The method of claim 6, further comprising the step of adding a runtime wrapper module to each of the new import tables, said runtime wrapper module providing system calls to the modified library functions to handle modified executable components.

8. The method of claim 1, further comprising the step of translating addresses for instructions and operands used in the modified executable components to compensate for changes in size of the modified executable components relative to the corresponding executable components in the original software program.

9. The method of claim 8, wherein the step of translating addresses is accomplished when the transformed software program is executed, further comprising the step of creating a mapping table for each modified executable component that is used to map address offsets in the modified executable component into address offsets in the executable component corresponding to the modified executable component.

10. The method of claim 1, wherein if the original software program employs an executable component that cannot be statically transformed and which includes a pointer to a modified executable component, further comprising the steps of:
   (a) providing a husk component having a position in a virtual memory address space identical to a position originally occupied by the executable component to which said modified executable component corresponds; and
   (b) including jumps to addresses in the modified executable component corresponding to procedure entry points in said executable component to which said modified executable component corresponds.

11. A method for creating a transformed software program from an original software program so that the transformed software program provides a new functionality, while retaining an underlying functionality of the original software program in the transformed software program, comprising the steps of:
   (a) evaluating an environment of the original software program to identify all executable modules that are included therein;
   (b) to carry out the new functionality, doing at least one of the following:
      (i) modifying at least one executable module; and
      (ii) adding a new executable module;
   (c) modifying any executable module identified as required to substantially emulate and maintain the underlying functionality of the original software program, by performing the steps of:
      (i) identifying each executable module on the list of the executable modules that must be modified to implement the new functionality;
      (ii) modifying the executable modules that are identified, creating modified executable modules corresponding to the executable modules identified; and
      (iii) parsing an import table of each of the executable modules to determine if any executable module that has been modified is called in the import table, and if so, creating a new import table that instead calls the modified executable module; and
   (d) saving any modified executable modules so that they are callable by the transformed software program.

12. The method of claim 11, wherein the step of evaluating the environment of the original software program comprises the steps of:
   (a) executing the original software program; and
   (b) writing a list of the executable modules that are loaded as the original software program executes.

13. The method of claim 11, wherein the step of evaluating the environment of the original software program comprises the steps of:
   (a) identifying an initial executable module;
   (b) analyzing an import table of the initial executable module to identify another executable module referenced therein;
   (c) repetitively analyzing the import table of successive executable modules that are identified, to identify additional executable modules; and
   (d) writing a list of the executable modules thus identified.

14. The method of claim 11, wherein the step of modifying an executable module as required to emulate and maintain the underlying functionality of the original software program comprises the step of adding a runtime wrapper module to the new import table, said runtime wrapper module referencing revised library function modules instead of original library function modules.

15. The method of claim 11, wherein the step of modifying any executable module identified, as required to emulate and maintain the underlying functionality of the original software program, further comprises the step of creating an address lookup table to indicate changes in addressing of the modified executable modules, which step is required due to differences in a size of each modified executable module relative to a size of its corresponding executable module.

16. A system for creating a transformed software program from an original software program so that the transformed software program provides a new functionality, while retaining an underlying functionality of the original software program, comprising:
   (a) a memory for storing machine instructions, said machine instructions defining a plurality of functions; and
   (b) a processor that executes the machine instructions stored in the memory, said machine instructions causing the processor to:

(i) evaluate an environment of the original software program to identify all executable modules that are included or referenced therein;
(ii) provide the new functionality by doing at least one of the following:
(1) modifying an executable module; and
(2) adding a new executable module;
(iii) emulate and maintain the underlying functionality of the original software program by modifying any executable module as required, by:
(1) identifying the executable modules on the list of the executable modules that must be modified to provide the new functionality; and
(2) parsing an import table of each of the executable modules to determine if any executable module that has been modified is called in the import table, and if so, creates a new import table in the memory that instead calls the modified executable module; and
(iv) save each modified executable module in the memory, so that the modified executable module is callable by the transformed software program.

17. The system of claim 16, wherein to evaluate the environment of the original software program, the processor:
(a) executes the original software program; and
(b) writes a list of the executable modules that are loaded as the original software program executes, into the memory.

18. The system of claim 16, wherein to evaluate the environment of the original software program, the processor:
(a) identifies an initial executable module;
(b) analyzes an import table of the initial executable module, to identify another executable module referenced therein;
(c) repetitively analyzes the import table of successive executable modules, to identify additional executable modules; and
(d) writes a list of the executable modules thus identified into the memory.

19. The system of claim 16, wherein to modify an executable module as required to emulate and maintain the underlying functionality of the original software program, the processor adds a runtime wrapper module to the new import table that references revised library function modules stored in the memory instead of original library function modules.

20. The system of claim 16, wherein to modify an executable module as required to emulate and maintain the underlying functionality of the original software program, the processor further creates an address lookup table that indicates changes in addressing of the modified executable modules, which is required due to changes in a size of any modified executable module relative to its corresponding executable module.

21. The system of claim 16, wherein if the original software program employs an executable component that cannot be statically transformed and which includes a pointer to a modified executable module, the machine instructions further cause the processor to:
(a) provide a husk module having a position in a virtual memory address space identical to a position originally occupied by an executable module to which said modified executable component corresponds; and
(b) include jumps to addresses in the modified executable module corresponding to procedure entry points in said executable module to which said modified executable component corresponds.

22. An article of manufacture adapted to be used with a computer to create a transformed software program from an original software program so that the transformed software program provides a new functionality, while maintaining an underlying functionality of the original software program in the transformed software program, comprising:
(a) a storage media adapted to be read by a computer; and
(b) a plurality of machine instructions stored on the storage media, said machine instructions, when executed by the computer, causing the computer to:
(i) evaluate an environment of the original software program to identify all executable modules that are included therein;
(ii) do at least one of the following as required to provide the new functionality:
(1) modify an executable module that was identified; and
(2) add a new executable module;
(iii) modify any executable module identified as required to emulate and maintain the underlying functionality of the original software program by:
(1) identifying any executable modules on the list of the executable modules that must be modified to implement the new functionality; and
(2) parsing an import table of each of the executable modules to determine if any executable module that has been modified is called in the import table, and if so, create a new import table that instead calls the modified executable module; and
(iv) save any modified executable modules and any new executable modules so that they are callable by the transformed software program.

23. The article of manufacture of claim 22, wherein to evaluate the environment of the original software program, the machine instructions cause the computer to:
(a) execute the original software program; and
(b) write a list of the executable modules that are loaded as the original software program executes.

24. The system of claim 22, wherein to evaluate the environment of the original software program, the machine instructions cause the computer to:
(a) identify an initial executable module;
(b) analyze an import table of the initial executable module to identify another executable module referenced therein;
(c) repetitively analyze the import table of successive executable modules to identify additional executable modules; and
(d) write a list of the executable modules thus identified.

25. The article of manufacture of claim 22, wherein to modify any executable module as required to emulate and maintain the underlying functionality of the original software program, the machine instructions cause the computer to add a runtime wrapper module to the new import table that references revised library function modules instead of original library function modules.

26. The article of manufacture of claim 22, wherein to modify any executable module as required to emulate and maintain the underlying functionality of the original software program, the machine instructions cause the computer to create an address lookup table to indicate changes in addressing of the modified executable modules, which is required due to differences in a size of any modified executable module relative to its corresponding executable module.

* * * * *

UNITED STATES PATENT AND TRADEMARK OFFICE
CERTIFICATE OF CORRECTION

PATENT NO. : 5,953,534
DATED : September 14, 1999
INVENTOR(S) : Romer et al.

It is certified that error appears in the above-identified patent and that said Letters Patent is hereby corrected as shown below:

| Column | Line | ERROR |
|---|---|---|
| 12 | 19 | after "blocks" insert --48-58-- |
| 12 | 52 | "Imnplementing" should read --Implementing-- |
| 17 (Claim 20, line 1) | 48 | "claim 16" should read --claim 11-- |

Signed and Sealed this

Fourth Day of April, 2000

*Attest:*

*Attesting Officer*

Q. TODD DICKINSON
*Director of Patents and Trademarks*